United States Patent [19]

Szymanski et al.

[11] Patent Number: 5,204,390

[45] Date of Patent: Apr. 20, 1993

[54] HOT MELT ADHESIVE RESISTANT TO ULTRAVIOLET LIGHT-INDUCED DEGRADATION AND TO PLASTICIZER MIGRATION

[75] Inventors: James P. Szymanski, Arden Hills; Eugene R. Simmons, Maplewood; Jeffrey S. Lindquist, St. Paul Park, all of Minn.

[73] Assignee: H.B. Fuller Company, Arden Hills, Minn.

[21] Appl. No.: 915,049

[22] Filed: Jul. 16, 1992

Related U.S. Application Data

[63] Continuation of Ser. No. 404,656, Sep. 8, 1989, abandoned.

[51] Int. Cl.⁵ .................... C08L 23/26; C08L 53/02
[52] U.S. Cl. .................................... 524/91; 524/99; 524/505; 524/512; 525/89; 525/93
[58] Field of Search .................... 524/91, 99, 505, 512; 525/89, 93

[56] References Cited

U.S. PATENT DOCUMENTS

| | | |
|---|---|---|
| 3,004,896 | 10/1961 | Heller et al. .......... 524/91 |
| 3,412,061 | 11/1968 | Drukker ............... 524/517 |
| 3,640,928 | 2/1972 | Murayama et al. ..... 524/99 |
| 4,250,272 | 2/1981 | Ewins, Jr. et al. ..... 525/89 |
| 4,680,249 | 7/1987 | Weed .................. 524/91 |
| 4,699,938 | 10/1987 | Minamizaki et al. ... 525/89 |
| 4,717,749 | 1/1988 | Tang et al. ........... 525/89 |
| 4,719,261 | 1/1988 | Bunnelle et al. ...... 524/505 |
| 4,725,641 | 2/1988 | Comert et al. ........ 525/89 |
| 4,734,447 | 3/1988 | Hattori et al. ........ 524/271 |
| 4,746,533 | 5/1988 | Hubbard .............. 427/27 |
| 4,760,148 | 7/1988 | Seltzer et al. ........ 524/91 |
| 4,845,182 | 7/1989 | Tochinai et al. ...... 525/89 |
| 4,871,803 | 10/1989 | Zimmel et al. ........ 525/89 |
| 5,028,646 | 7/1991 | Miller et al. ......... 524/505 |

*Primary Examiner*—Kriellion S. Morgan
*Attorney, Agent, or Firm*—Merchant, Gould, Smith, Edell, Welter & Schmidt

[57] ABSTRACT

The invention relates to a PSA hot melt composition that exhibits adhesive stability when exposed to ultraviolet light and is stable when contacted with plasticized surfaces.

19 Claims, No Drawings

HOT MELT ADHESIVE RESISTANT TO ULTRAVIOLET LIGHT-INDUCED DEGRADATION AND TO PLASTICIZER MIGRATION

This is a continuation of application Ser. No. 07/404,656, filed Sep. 8, 1989, which was abandoned upon the filing hereof.

FIELD OF THE INVENTION

The invention relates to a pressure-sensitive hot melt adhesive (PSA) that has excellent UV stability and resistance to plasticizer migration. The PSA of this invention can be used in common pressure sensitive applications and provides maximum benefit in areas where the PSA is exposed to sunlight, UV light, or when applied to plasticized surfaces.

BACKGROUND OF THE INVENTION

Hot melt PSA's have been used to bond a variety of materials to many substrates. A pressure-sensitive adhesive is an adhesive that retains high surface tackiness over time. In other words, a PSA has a theoretically infinite open time. The bonding force of the PSA is derived from the ability of the adhesive to be compatible with the surface of both the substrate and the bonded materials. The adhesive bond arises from the compatibility of the adhesive mass with both the object and the substrate and the internal cohesiveness of the adhesive mass. Any change in the nature of the adhesive materials can have a large effect on bond strength and the cohesiveness of the adhesive. Any substantial degradation of the adhesive materials can cause loss of bond strength. Further, adhesive bond strength is reduced by contamination of the adhesive material or interference between surfaces at the interface between the adhesive bond and the adjacent surface.

We have found that the degradation of the adhesive mass and the resulting bond can be caused by electromagnetic radiation such as visible and ultraviolet light. The radiation degrades the polymer species in the adhesive, increases brittleness or substantially lowers molecular weight. Further, the contamination of the adhesive mass by plasticizer migrating from an adjacent surface of a plasticized object can cause substantial adhesive bond reduction.

Plasticizers are used to alter the glass transition temperature of the polymer used in the adhesive which can enhance adhesive compatibility with surfaces. The glass transition temperature ($T_g$) is a temperature below which free rotation of the polymer ceases due to intramolecular energy barriers. Well-plasticized adhesives retain a solid physical nature while having significant flexibility and surface compatibility. There are generally two types of plasticization. A polymer may be "internally plasticized" or "externally plasticized." An internally-plasticized polymer is plasticized using copolymerized monomers. The plasticizing comonomer lowers the overall $T_g$ and plasticizes the polymer. External plasticizers are added to a polymer to form a plasticized mixture of polymer and plasticizer.

Vinyl resin materials are often heavily plasticized to improve manufacture and use properties. Plasticizers are intimately mixed with the vinyl plastic material. After a period of time under heat or other driving force, plasticizers can physically separate from the vinyl plastic. Both volatile and non-volatile plasticizers can physically migrate from the vinyl material to an adjacent compatible layer. The migration occurs wherein the adhesive system is in contact with a vinyl plastic. The vinyl plasticizer, which is often soluble or compatible with the adhesive, can migrate into the adhesive mass.

Hot melt adhesives are thermoplastic materials that can be applied in melt form, typically free of an aqueous or organic solvent, that when cooled can form a solid bond line. Upon contact with the substrate, the hot melt adhesives can cool, solidify, and form a strong bond between an object and a substrate surface. Hot melt adhesives can be pressure-sensitive depending upon formulation.

Organic molecules that make up the hot melt PSA material can contain groups or bonds which absorb electromagnetic radiation, such as UV light. The energy from the radiation can cause oxidation, further polymerization, depolymerization, crosslinking, and a variety of other reactions. Such reaction in the base polymer or adhesive additive can substantially change the properties of the adhesive mass. The adhesive can lose flexibility, can lose cohesiveness, can have reduced adhesive bond strength, etc. While this UV degradation problem has attracted a great deal of attention, no fully-satisfactory material has been found for use in application subject to exposure to sunlight or other sources of copious amounts of UV light.

Further problems result from plasticizer contamination. Plasticizer present in a typically resinous substrate can migrate from the substrate into the adhesive layer. This migration can be promoted by heat, chemical concentration gradients, relative compatibility or solubility, and environmental conditions. Over time, as the plasticizer migrates into the adhesive, slowly increasing in concentration, the adhesive polymer base becomes diluted, resulting in a weakened adhesive. Thus, there is a need for an adhesive which resists the migration of the plasticizer.

Hattori et al., U.S. Pat. No. 4,734,447, discloses an improved hot melt adhesive composition comprising a styrene block copolymer resin, a tackifier, and a room temperature solid polybutene having a molecular weight greater than 1,000,000. The solid polybutene recited in the Hattori patent is reacted within an organic peroxide, for example, benzyl peroxide, to cleave the polybutene molecule. The Hattori material is not a true pressure-sensitive adhesive since it loses open time after application.

We are aware that PSA's have been formulated with an ABA block copolymer, a tackifying resin, and an oil plasticizer. These adhesive systems can be subject to both UV and plasticizer migration problems. Similar compositions using an unmodified polybutene plasticizer can have plasticizer stability without UV resistance. Similarly, PSA's with an ABA block copolymer, with no plasticizer, blended with liquid resins can be made UV stable but generally lack plasticizer stability.

Lastly, for many years, solvent-based adhesives comprising a major proportion of an organic solvent, typically vinyl polymers and additional adhesive components, have been applied to a variety of substrates for the purpose of displaying PSA properties in adhering the substrate to objects and other substrates. Such solvent-based adhesives suffer the severe disadvantage that many solvents are flammable or objectionable due to toxic or other undesirable effects on workers. Suitable replacements for solvent-based adhesives have been an object of search for many years.

Accordingly, a significant need exists for a hot melt PSA composition which combines, in a single composition, excellent UV stability, resistance to plasticizer migration, and can be used as a substitute for solution-acrylic (solvent-based) and emulsion-acrylic (aqueous-based) adhesives which have long dominated many adhesive applications and uses, including adherent tape, adhesive film, PSA labels, and others.

SUMMARY OF THE INVENTION

We have now found that a pressure-sensitive hot melt adhesive can be prepared from environmentally-stable, substantially saturated ingredients comprising thermoplastic resin, a hydrocarbon resin, and an end-capped polybutene. The PSA material of the invention can be formulated to be stable under ultraviolet light and in the presence of plasticizer while having sufficient strength to bond a variety of substrates. The adhesive composition comprises:
  a) about 1–75 wt-% of a substantially saturated thermoplastic resin having a molecular weight up to about 200,000;
  b) about 1–75 wt-% of a tackifying resin;
  c) about 10–50 wt-% of an end-capped polybutene plasticizer, having a molecular weight less than about 5,000; and
  d) optionally, an effective amount of a thermal stabilizer or a UV light absorber.

The adhesive can contain a blend of about 0.001–1 wt-% of UV light absorber and about 0.001–1 wt-% of antioxidant composition or thermal stabilizer composition.

DETAILED DESCRIPTION OF THE PREFERRED EMBODIMENT

THERMOPLASTIC RESIN

Briefly, the hot melt adhesive of the invention comprises a substantially saturated thermoplastic resin or polymer, a tackifying resin, and an end-capped viscous liquid polybutene (M.W. less than 5,000) plasticizer. These ingredients cooperate to resist UV induced reaction, depolymerization, or degradation and to prevent plasticizer migration from any surface contacted by the adhesive. The adhesive can comprise an effective blend of UV light absorbers, antioxidants and thermal stabilizers, found to provide unique and significant levels of thermal and UV stability to the adhesive material.

Thermoplastic polymers used in the adhesive compositions of the invention provide cohesive strength to the final adhesive material and provide a medium for dissolution or suspension of the balance of the adhesive ingredients. In this way, the thermoplastic polymer tends to act as a vehicle exhibiting the properties provided by the adhesive components and cooperates with the adhesive components to provide the final adhesive properties.

Thermoplastic polymers that can be used in the invention include substantially saturated polymeric compositions having a glass transition temperature of about $-90°$ to $100°$ C., and a molecular weight up to about 200,000. There are many useful thermoplastic polymers which may be used. Among the polymers envisioned for the present invention are vinyl polymers, polyesters, polyethers, etc.

The preferred class of polymers for use in the invention comprises substantially saturated rubbery block copolymers derived from vinyl aromatic monomers including styrene and others, and rubbery monomers such as butylene, ethylene, isobutylene, butadiene, isoprene, and others. In block polymers with some unsaturation, the material can be hydrogenated to reduce or eliminate unsaturation. Such polymeric and copolymeric compositions include butadiene-styrene block copolymers, isoprene-styrene block copolymers, styrene-isoprene-styrene block copolymers, styrene-butadiene-styrene block copolymers, styrene-ethylene-butadiene-styrene block copolymers, and others. Both diblock AB and ABA block copolymers may be used. In the formula, A represents a polystyrene block, while B represents a substantially saturated midblock. These block copolymers have 10 to 40 wt-%, most preferably, 15 to 35 wt-% styrene and a molecular weight of the entire polymer, at least preferably 50,000 to 70,000.

Another particularly preferred class of monomers include the acrylic class made from monomers such as acrylic acid, methacrylic acid, methacrylate, methylmethacrylate, hydroxyacrylate, and hydroxyacrylmethacrylate, which can be formed in combination with other vinyl monomers including ethylene, styrene, propylene, vinyl chloride and others. The molecular weight and the crosslinking extent of these polymers are selected such that the polymer can be easily handled in the molten form and possess a viscosity such that it can be processed in common hot melt adhesive-formulating equipment.

Polybutene Plasticizers

Plasticizers are generally classified as materials that can be incorporated into another material to increase its workability, flexibility, or distensibility. They can also cooperate with the thermoplastic resin to enhance the tackifying effect of the tackifying resin. The addition of a plasticizer can lower melt viscosity, the temperature of the second glass transition point, or the elastic modulus of the treated material.

A polybutene polymer comprises a polymer resulting from the polymerization of major proportions of a monomer selected from the group consisting of 1-butene,2-butene, isobutylene (2-methyl-propene), butadiene, or mixtures thereof. Such polymers are typically viscous liquids having a viscosity of at least 50 cST at 33° C., preferably from 60 to about 950 cST at 99° C., and a molecular weight at least 300 to about 5,000, and preferably from about 360 to about 1500. The preferred polybutene polymers of the invention, that can be end-capped for use in the adhesive, can have a viscosity of about 800 to about 950 cST at 99° C., and a molecular weight of about 1300 to 1500 and have residual terminal unsaturation.

End-capped polybutenes can be utilized in the adhesive composition of the present invention in an amount of about 10–50 wt-%, about 20 to 40 wt-%, preferably 25 to 35 wt-%. The end-capping of the polybutene removes residual unsaturation to increase stability. The end-capped polybutenes act both as a plasticizer for the adhesive and act to modify the nature of the adhesive to prevent a plasticizer residing in an adjacent layer from migrating from the substrate or from the surrounding environment into the adhesive layer. Further, the stabilized end-capped polybutene cooperates with the other adhesive components to prevent thermal and UV degradation. End-capping reagents react with and remove residual unsaturation typically found at a terminus of the polymer molecule.

The Terminal Vinyl Group Remaining in the Polybutene After Preparation

Some of the possible end-caps for the polybutene which are envisioned with the present invention include end-caps resulting from a reaction between the vinyl or ethylenically-unsaturated group and an epoxidation reagent that can create a terminal oxirane ring at the site of unsaturation in the polymer, a hydrogenating reagent, an electrophilic reagent, an alcohol or alcoholate reagent, a phosphorus halide or phosphorous sulfide compound, an alpha-beta unsaturated mono- or dicarboxylic acid or anhydride, a phenol or phenate reagent, a source of halogen or halide, an alkylating agent, etc. Although not wishing to be held by any theory, it appears that the particular end-cap to be used for the polybutene is not important, but rather, that the polybutene itself is end-capped. Thus, any end-capping material that reacts with polybutene may be used.

The end-capping reaction is conducted by contacting the polymer with an active end-capping reagent that can react with unsaturation in the terminal unsaturated group or other residual unsaturation in the polymer molecule. The reaction results in the elimination of the terminal or residual unsaturation from the polymer resulting in bonding of lesser reactivity or UV absorbance character. Virtually any material reactive with such unsaturation can be useful in end-capping the polybutene polymer.

The end-capping reagent is typically added to the neat polymer and is uniformly distributed into the polymer for reaction. Reaction is typically promoted using heat and catalyst, if necessary. Typical temperatures for reaction between the end-capping reagent and the terminal unsaturation of the polybutene polymer comprises from about 50° C. to about 220° C., preferably about 100°-200° C., for a period of time of about 10 to 240 minutes.

The terminal unsaturation of polybutene polymers can be reacted with a variety of end-capping reagents, including the following examples.

Halogen reactants can be used to end-cap the materials. Halogen such as $Cl_2$, $F_2$, $Br_2$, $I_2$, can add across the double bond, forming saturated di-halo compounds.

The terminal unsaturation of the polybutene can be hydrogenated with $H_2$ and other hydrogen-yielding compounds in the presence of typically-metallic catalysts to remove the terminal unsaturation, producing a fully-saturated hydrocarbon.

A variety of electrophilic reagents can add to the double-bond. For example, hypohalous acids can add across the double bond creating a halogen group and a hydroxyl as saturated carbons. A variety of acidic groups can add across the double bond providing a hydrogen atom and an acidic substituent. For example, hydrochloric acid can add across a double bond resulting in a hydrogen and a chloride substituent as saturated carbons. Water is known to add across the double bond forming an alcoholic substituent as saturated carbons.

The terminal unsaturation of a polybutene material can be oxidized introducing a peroxy oxirane ring into the terminal unsaturation of the polyisobutylene. A variety of epoxidizing reagents are known to produce such a reaction. The terminal unsaturation of the polybutene can be epoxidized using common agents, including per acids such as perbenzoic acid, chloroperbenzoic acid, peroxyacetic acid, triflouroperacetic acid, etc.

Under basic conditions, hydrogen peroxide and t-butyl hydroperoxide can be used.

The preferred plasticizer is an end-capped polyisobutylene plasticizer comprising polymerized isobutylene (2-methyl-propene) in conjunction with small proportions (less than 10.0 wt-%) of other $C_4$ monomers such as 1-butene, 2-butene, and butadiene. The idealized structure of non-capped polyisobutylene is as follows:

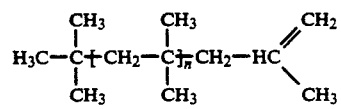

The percentage of end-cap may vary but, preferably it is within the range of 10 to 90 wt-%, preferably 10 to 50 wt-%. However, the range may be larger, depending on the application.

We have found that the preferred end-capping reaction for use in producing a migration-free adhesive comprises an epoxidation of terminal unsaturation group producing a terminal epoxy or oxirane group,

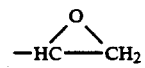

Tackifying Resin

The adhesives of the invention contain a tackifying resin in combination with the substantially thermoplastics mentioned above. Tackifying resins useful in the adhesive of the invention comprise substantially saturated hydrocarbon tackifying resins.

The preferred tackifying resins useful in the adhesive compositions can be saturated hydrocarbon resins, hydrogenated synthetic polyterpenes, natural hydrogenated terpenes, and the like. The tackifying agents comprise copolymers and terpolymers of natural terpenes, e.g., styrene/terpene and alphamethyl styrene/terpene; polyterpene resins having a softening point, as determined by ASTM Method 828-58T of from about 80° to 150° C.; the polyterpene resins generally resulting from the polymerization of terpene hydrocarbons such as the bicyclic monoterpene known as pinene, in the presence of Friedel-Crafts catalysts at moderately low temperatures; also included are the hydrogenated terpene resins; phenolic modified hydrogenated polyterpene resins and hydrogenated derivatives thereof, such as, for example, the resin product resulting from the condensation, in an acidic medium of a bicyclic terpene and a phenol; aliphatic petroleum hydrocarbon resins having a ball and ring-softening point of from about 70° to 135° C.; and the resins resulting from the polymerization of monomers consisting primarily of olefins and diolefins; also included are the hydrogenated aliphatic petroleum hydrocarbon resins; aromatic petroleum hydrocarbon resins and hydrogenated derivatives thereof; and alicyclic petroleum hydrocarbon resins and hydrogenated derivatives thereof. Mixtures of two or more of the above-described tackifying resins may be required for some formulations.

Aromatic monomers useful in forming aliphatic-aromatic resin compositions of this invention can be prepared from any monomer containing substantial aromatic qualities and a polymerizable unsaturated group. Typical examples of such aromatic monomers include the styrenic monomers, styrene, alphamethylstyrene, vinyl toluene, methoxystyrene, tertiary butyl styrene, chlorostyrene, etc., indene monomers including indene, methyl indene, and others. Aliphatic monomers are typical, natural, and synthetic terpenes which contain $C_5$ and $C_6$ cyclohexyl or cyclopentyl saturated groups that can additionally contain a variety of substantial, automatically-linked substituents. Aliphatic tackifying resins can be made by polymerizing a feedstream containing sufficient aliphatic monomers such that the resulting resin exhibits aliphatic characteristics. Such feedstreams can contain other aliphatic unsaturated monomers such as 1,3-butadiene, 1,3 pentadiene, trans-1,3 pentadiene, 2-methyl-1,3-butadiene, 2-methyl-2-butene, cyclopentadiene, dicylcopentadiene, terpene monomers, and others. Mixed aliphatic-aromatic resins contain sufficient aromatic monomers and sufficient aliphatic monomers and optionally other $C_3$-$C_8$ unsaturated monomers to produce a resin having both aliphatic and aromatic character. The article by Davis, *The Chemistry of $C_5$ Resins*, discusses synthetic $C_5$ resin technology. Such materials, containing residual unsaturation can be treated chemically or hydrogenated to reduce residual unsaturation, if necessary.

Representative examples of such aliphatic resins include hydrogenated synthetic $C_9$ resins, synthetic branched and unbranched $C_5$ resins, and mixtures thereof.

Representative examples of such aromatic tackifying resins include styrenated terpene resins, styrenated $C_5$ resins, and mixtures thereof.

UV Absorbers

UV absorbers can be included in the adhesive composition to absorb the harmful portion of the electromagnetic spectrum between 300 and 400 nm. An effective UV absorber dissipates energy absorbed through conjugated bond structures, by transferring the energy to surroundings by heat or by reemitting it as longer wavelengths through phosphorescence, fluorescence, or infrared radiation.

Among the possible UV absorbers are 2-(hydroxyphenyl)-benzotriazole, 2-hydroxybenzophenone, alkyl-2-cyano-3-phenylcinnamate, phenylsalicylate, and 1,3,5-Tris(2'-hydroxyphenyl)triazine. The preferred UV absorbers for the present invention are substituted and unsubstituted benzyltriazole, shown in U.S. Pat. No. 3,004,896.

Antioxidants/Thermal Stabilizer

The hot melt adhesives of the present invention may also incorporate relatively small amounts of adjuvants such as antioxidants. Typically antioxidants include the Irganox® series (Ciba-Geigy) and distearyl pentaerythritol disphosphate compounds (Weston® 619, Borg-Warner Chemicals). When present, such adjuvants will commonly make up less than 5 wt-% of the present adhesive. In the preferred embodiment of the present invention, 0 to 5 wt-% of an antioxidant is used, however, it may exceed 5 wt-%. The preferred composition comprises 0.2 wt-% of Irganox® 1010 and 0.2 wt-% of Irganox® 1076, both available from Ciba-Geigy. Thermal stabilizers are included in the present invention to prevent thermal degradation which occurs during the manufacturing and application of the hot melt adhesive. The result of such degradation is, among other things, loss of adhesive properties. Possible stabilizers envisioned for the present adhesive include hindered amines and phenols. The definition of a hindered amine or phenol is an amine or phenol compound with a sterically-hindering group or radical located in close proximity to the amine or phenolic compound. The presence of these bulky groups prevents the stretching frequency and the reactivity of the phenolic or amine compound. Among the preferred compounds of the present invention are hindered amine compounds shown in U.S Pat. No. 3,640,928, Tinuvin 770 and Tinuvin 325, available from Ciba-Geigy.

In the preferred embodiment, a range of 0.001 to 5 wt-% of UV absorber or 0.001 to 5 wt-% of a thermal stabilizer, or mixtures thereof, can be used. In the most preferred embodiment, 0.1 wt-% Tinuvin 770 and 0.1 wt-% Tinuvin 325 are used. In the preferred embodiment, about 0.01 to 2 wt-% of each can be used. The preferred stabilizer material is about 0.1 to 2 wt-% of a blend of UV absorber and stabilizer mixed at a ratio of about 0.1 to 10:1, present in the amount of 0.1 wt-% each.

TABLE

| | Adhesive Compositions (Wt %) | | |
|---|---|---|---|
| | Useful | Preferred | Most Preferred |
| AB Copolymer* | 0 to 80 | 5-50 | 10-25 |
| ABA Copolymer* | 0 to 80 | 0-40 | 5-15 |
| Tackifier** | 10 to 50 | 20-40 | 25-35 |
| End-Capped Polybutene | 10 to 50 | 20-40 | 25-35 |
| Antioxidant | 0.001 to 5 | 0.05-2 | 0.05-1 |
| UV Absorber | 0.001 to 5 | 0.05-2 | 0.05-1 |

*The total AB and ABA concentration should be at least 10 wt %.
**Tackifier blends can be used.

The adhesives of this invention are applied to substrates, e.g., metal foils, cellulosics, fluorocarbon sheets, polyesters, metallized polyester, polyethylene foamed polystyrene or polypropylene sheets, or any other substrates which can utilize a hot melt adhesive. The adhesives of the invention can be used to make adherent articles by applying to at least one surface of a sheet-like material a thin film of the adhesive. The adherent articles can be labels, tapes, structural members, etc.

Application of an adhesive to the sheet-like substrate may be by roller, dip plus doctor blade, printed dots, extrusion application wheels, or other similar, well-known apparatus.

The following examples illustrate a method of manufacturing the adhesives within the scope of the invention and include a best mode.

EXAMPLE I

The following amounts of the materials were added to a mixing vessel according to the procedure below.

| Material | Common Name | Amount |
|---|---|---|
| KRATON G-1726 (Shell Chemical) | SEBS Linear Rubber 70% diblock | 30.0% |
| ACTIPOL (Amoco) | An epoxidized (end-capped) polybutene plasticizer (M.W.* 900-1400) | 34.4% |
| REGAL REZ 1094 (Hercules) | A fully hydrogenated hydrocarbon resin | 35.0% |
| IRGANOX 1010 (Ciba-Geigy) | Antioxidant/thermal stabilizer | 0.2% |
| IRGANOX 1076 (Ciba-Geigy) | Antioxidant/thermal stabilizer | 0.2% |
| TINUVIN 770 (Ciba-Geigy) | Benzotriazole UV absorber | 0.1% |
| TINUVIN 325 | A hindered amine UV absorber | 0.1% |

| Material | Common Name | Amount |
|---|---|---|
| (Ciba-Geigy) | | |

*Number Average

Into a heated SIGMA blade mixer is placed 17.5 parts of the tackifying resin with a 94° C. softening point (REGAL REZ 1094) and 30 parts of the diblock polymer with the antioxidant blend. This initial mixture was blended until smooth. The balance of the tackifier is added and blended until smooth. The epoxidized plasticizer is added with the UV absorbers and blended smooth.

EXAMPLE II

The following amount of the materials were added to a mixing vessel according to the procedure of Exaple I.

| Material | Common Name | Amount |
|---|---|---|
| KRATON G-1726 (Shell Chemical) | SEBS Linear Rubber 70% diblock | 30.0% |
| ACTIPOL (Amoco) | An epoxidized (end-capped) polybutene plasticizer (M.W.* 900-1400) | 34.4% |
| ARKON P-115 (Arakawa) | A hydrocarbon resin | 35.0% |
| IRGANOX 1010 (Ciba-Geigy) | Antioxidant/thermal stabilizer | 0.2% |
| IRGANOX 1076 (Ciba-Geigy) | Antioxidant/thermal stabilizer | 0.2% |
| TINUVIN 770 (Ciba-Geigy) | Benzotriazole UV absorber | 0.1% |
| TINUVIN 325 (Ciba-Geigy) | A hindered amine UV absorber | 0.1% |

*Number Average

EXAMPLE III

The following amounts of the materials were added to a mixing vessel according to the procedure of Example I.

| Material | Common Name | Amount |
|---|---|---|
| KRATON G-1726 (Shell Chemical) | SEBS Linear Rubber 70% diblock | 30.0% |
| ACTIPOL (Amoco) | An epoxidized (end-capped) polybutene plasticizer (M.W.* 900-1400) | 34.4% |
| REGAL REZ 1094 (Hercules) | A fully hydrogenated hydrocarbon resin | 17.5% |
| ARKON P-115 (Arakawa) | A hydrocarbon resin | 17.5% |
| IRGANOX 1010 (Ciba-Geigy) | Antioxidant/thermal stabilizer | 0.2% |
| IRGANOX 1076 (Ciba-Geigy) | Antioxidant/thermal stabilizer | 0.2% |
| TINUVIN 770 (Ciba-Geigy) | Benzotriazole UV absorber | 0.1% |
| TINUVIN 325 (Ciba-Geigy) | A hindered amine UV absorber | 0.1% |

*Number Average

EXAMPLE B

Example I was repeated except that 14.4% of Actipol epoxidized polybutene was replaced with 34.4% of a plasticizer oil.

TABLE I

| Rolling Ball Tack | |
|---|---|
| Example B: | |
| Unexposed | 1.1" |
| UV exposed | greater than 3" |
| Example A: | |
| Unexposed | greater than 3" |
| UV exposed | greater than 3" |
| Example III: | |
| Unexposed | 1.75" |
| UV exposed | 1.8" |

TABLE II

| Polyken Probe Tack | |
|---|---|
| Example B: | |
| Unexposed | 850 (average of 5) |
| UV exposed | 0 |
| Example A: | |
| Unexposed | 310 (average of 4) |
| UV exposed | 1,150 (average of 4) |
| Example III: | |
| Unexposed | 1,480 (average of 5) |
| UV exposed | 1,300 (average of 5) |

The compositions of the invention have been shown to be resistant to contamination by migration of plasticizer into a bond line. The 90° and 180° peel tests of the adhesive film showed stability over time when adhered to a heavily plasticized surface.

Tables I and II show stability of the end-capped polybutene plasticizer-containing adhesive when compared to oil plasticized and conventional polybutene plasticized adhesive. Further, the end-capped polybutene plasticizer adhesive is also plasticizer stable.

The above specification, examples, and data provide a basic disclosure and explanation of the invention. However, since many embodiments and variations of the invention can be made without departing from the spirit and scope of the invention, the invention is embodied in the claims hereinafter appended.

What is claimed is:

1. A hot melt pressure-sensitive adhesive PSA composition comprising:
   (a) about 1–75 wt-% of a substantially saturated thermoplastic resin having a molecular weight of up to about 200,000;
   (b) about 1–75 wt-% of a hydrocarbon resin; and
   (c) about 10–50 wt-% of a plasticizer comprising an end-capped reaction product of a polybutene polymer having a molecular weight of up to about 5,000 and terminal ethylenic unsaturation, and a compound that can react with an ethylenically unsaturated group;
wherein the plasticizer, thermoplastic resin and hydrocarbon resin cooperate to significantly stabilize the adhesive against UV radiation and the adhesive exhibits stable adhesive properties upon exposure to UV radiation and is resistant to migration of plasticizer, when adhered to a surface.

2. The adhesive of claim 1 wherein the thermoplastic comprises a substantially saturated rubbery block copolymer.

3. The adhesive of claim 2 wherein the copolymer comprises an AB block copolymer, an ABA block copolymer, or mixtures thereof, wherein A is a polystyrene block and B is a saturated rubbery midblock.

4. The adhesive of claim 3 wherein B is a polymer block made from monomers selected from the group consisting of ethylene, isoprene, butadiene, and mixtures thereof.

5. The adhesive of claim 3 wherein the block copolymer contains 70 wt-% of an AB diblock polymer.

6. The adhesive of claim 1 which additionally contains an antioxidant thermal stabilizer.

7. The adhesive of claim 1 which additionally contains a UV stabilizer.

8. The adhesive of claim 1 wherein the hydrocarbon resin comprises fully hydrogenated hydrocarbon tackifying resin.

9. The adhesive of claim 7 wherein the UV light stabilizer is a benzotriazole composition.

10. The adhesive of claim 9 wherein the stabilizer is a substituted benzotriazole.

11. The adhesive of claim 6 wherein the antioxidant is a hindered phenol.

12. The adhesive of claim 1 wherein the polybutene is end-capped with an oxirane group through a peracid or peroxide oxidation reaction.

13. The adhesive of claim 1 wherein the polybutene plasticizer is end-capped through hydrogenation.

14. The adhesive of claim 1 which additionally comprises a mixture of a UV stabilizer and an antioxidant.

15. A hot melt pressure-sensitive adhesive composition comprising:
   (a) about 10–60 wt-% of a mixture of about 20 to 90 wt-% of an AB block copolymer and about 10 to 80 wt-% of an ABA block copolymer, wherein A comprises a polystyrene block and B comprises an ethylene butylene rubbery midblock, each copolymer having a molecular weight of about 40,000–170,000;
   (b) about 10–50 wt-% of a plasticizer comprising an end-capped reaction product between a polyisobutylene polymer having a molecular weight of up to about 5,000 and an epoxidizing agent;

wherein the plasticizer, thermoplastic resin and hydrocarbon resin cooperate to significantly stabilize the adhesive against UV radiation and the adhesive exhibits stable adhesive properties upon exposure to UV radiation and is resistant to migration of plasticizer, when adhered to a surface.

16. The adhesive of claim 15 wherein the adhesive additionally comprises an antioxidant and a UV stabilizer.

17. The hot-melt pressure-sensitive adhesive composition comprising:
   (a) about 10–40 wt-% of a mixture of an AB block copolymer and an ABA block copolymer wherein A is a polystyrene block and B is an ethylene butylene rubbery midblock wherein the mixture contains about 50–80 wt-% of the AB polymer and 20–50 wt-% of the ABA polymer;
   (b) about 10–40 wt-% of a hydrogenated hydrocarbon;
   (c) about 14–45 wt-% of a plasticizer comprising the end-capped reaction produce between a polyisobutylene polymer having a molecular weight of about 500 to 5,000, and an epoxidizing agent that can react with the ethylenically unsaturated group to produce a oxirane group; and
   (d) about 0.01 to about 2 wt-% of stabilizing moisture comprising a UV absorber and a thermal antioxidant;

wherein the plasticizer, thermoplastic resin and hydrocarbon resin cooperate to significantly stabilize the adhesive against UV radiation and the adhesive exhibits stable adhesive properties upon exposure to UV radiation and is resistant to migration of plasticizer, when adhered to a surface.

18. A tape comprising an elongated flexible web having at least one adherent layer of the adhesive of claim 1.

19. A lable comprising a flexible web having at least one adherent layer of the adhesive of claim 1.

* * * * *